(No Model.) 3 Sheets—Sheet 2.

O. W. O'DELL.
HOISTING AND CONVEYING DEVICE.

No. 428,349. Patented May 20, 1890.

WITNESSES:
W. R. Davis
C. Sedgwick

INVENTOR
O. W. O'Dell
BY Munn & Co
ATTORNEY (No Model.) 3 Sheets—Sheet 3.
O. W. O'DELL.
HOISTING AND CONVEYING DEVICE.
No. 428,349. Patented May 20, 1890.
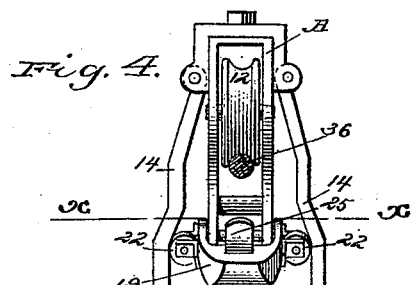
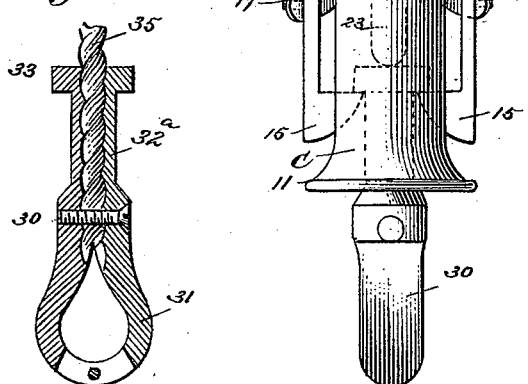
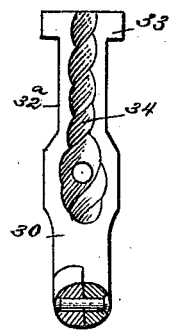
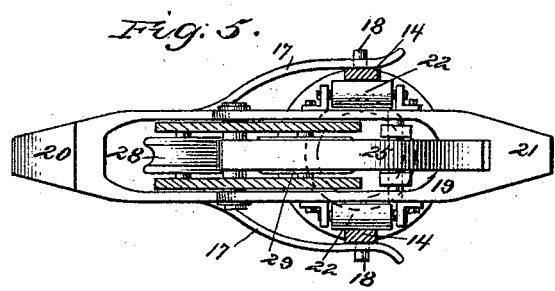
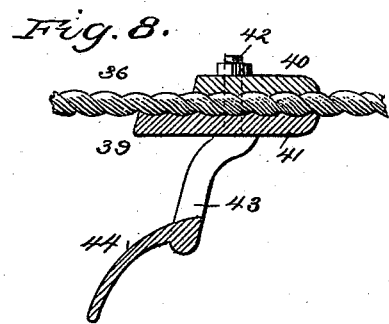
WITNESSES:
W. R. Davis
C. Sedgwick
INVENTOR
O. W. O'Dell
BY
Munn & Co.
ATTORNEY

UNITED STATES PATENT OFFICE.

OREN W. O'DELL, OF FENTON, MICHIGAN, ASSIGNOR OF TWO-THIRDS TO LEVI BARNUM AND T. P. BARNUM, BOTH OF SAME PLACE.

HOISTING AND CONVEYING DEVICE.

SPECIFICATION forming part of Letters Patent No. 428,349, dated May 20, 1890.

Application filed March 5, 1889. Serial No. 301,820. (No model.)

*To all whom it may concern:*

Be it known that I, OREN W. O'DELL, of Fenton, in the county of Genesee and State of Michigan, have invented a new and useful Improvement in Combined Hoisting and Conveying Devices, of which the following is a full, clear, and exact description.

My invention relates to an improved hoisting and conveying device adapted for use in elevating and transferring heavy substances and carrying the same horizontally to any desired point, and lowering the load when it reaches its destination, the invention being especially adapted for employment in connection with hay-forks, breeches-buoys, well-digging, mining, loading and unloading vessels, &c.

The invention has for its object to provide a device of simple, economical, and durable construction, and capable of convenient and effective manipulation.

The invention consists in the novel construction and combination of the several parts, as will be hereinafter more fully set forth, and pointed out in the claims.

Reference is to be had to the accompanying drawings, forming a part of this specification, in which similar letters and figures of reference indicate corresponding parts in all the views.

Figure 1:
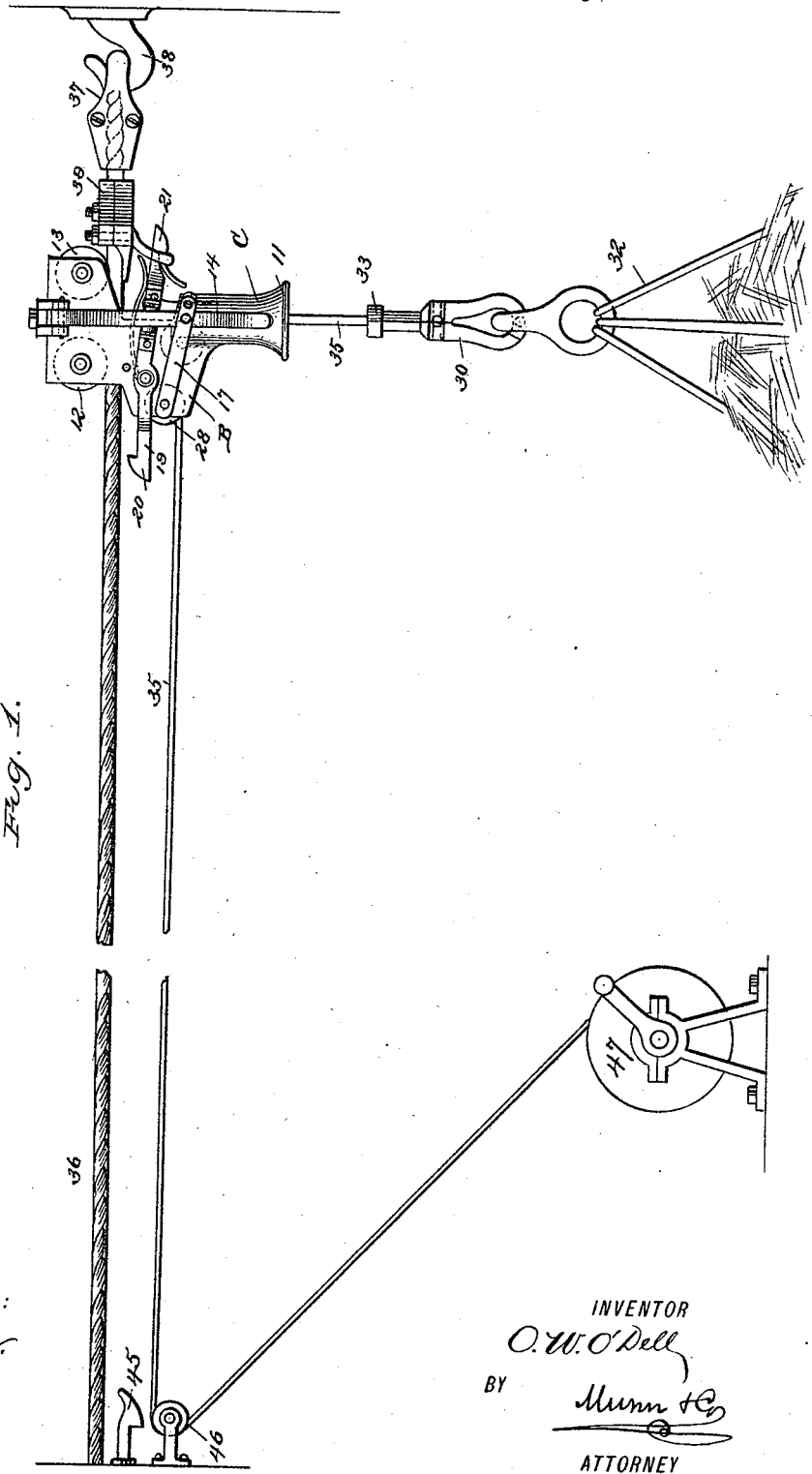
Figure 2:
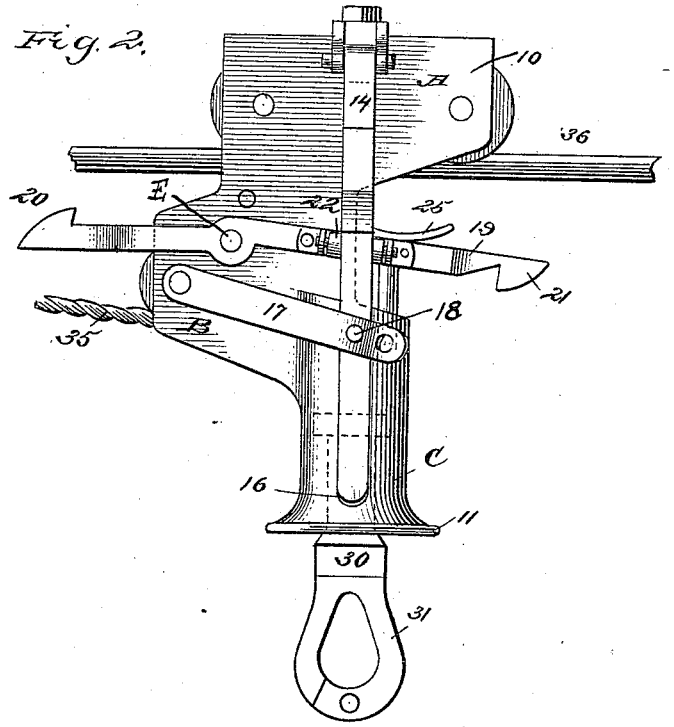
Figure 3:
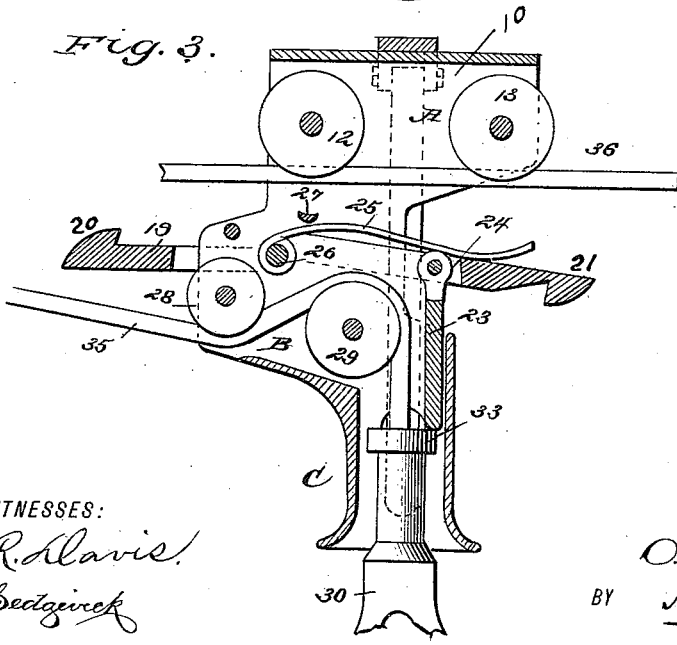

Figure 1 is a side elevation of the device in position for use, illustrating the same as locked to receive a load. Fig. 2 is a side elevation of the same detached. Fig. 3 is a central vertical section through the device. Fig. 4 is a front elevation. Fig. 5 is a horizontal section on line $x\ x$ of Fig. 4. Figs. 6 and 7 are vertical sections through the hoisting or trip sleeve taken at a right angle to each other, and Fig. 8 is a central vertical section through the latch-block.

In carrying out the invention the body of the carrier consists of a hollow shell 10, comprising an essentially upper forwardly-extending section A, an intermediate oppositely and rearwardly extending section B, and a lower funnel-shaped tubular section C. The upper and intermediate sections are open at both ends, and the tubular section is open at top and bottom, the bottom of the said latter section being preferably made flaring, as illustrated at 11.

In the upper section A two grooved pulleys 12 and 13 are journaled, one near each end, and upon each side of the said upper section, at or near the center of the upper edge, the upper end of a spring-actuated arm 14 is pivotally secured, which arms are carried perpendicularly downward, their lower ends being provided with a latch-head 15, as best shown in Fig. 4. The latch-heads 15 are normally projected within the lower or tubular section C through slots 16 by the action of springs 17. One spring 17 is provided for each arm, the rear end whereof is rigidly attached to the outer face of the intermediate sections at the rear extension, as best shown in Fig. 2, and the opposite end is made to bear upon the outer side of the respective arms, as is also illustrated in the same figure and likewise in Fig. 5. The springs and arms are usually retained in contact by producing an aperture in the former capable of receiving a pin 18, integral with or attached to the latter.

A latch-lever 19 is centrally slotted, and through said slot the intermediate section B of the shell is carried, the said lever 19 being pivotally attached to the said intermediate section above the center and near the rear end, as illustrated at E in Figs. 2 and 3. The latch-lever 19 is provided at the extremities with latch-heads 20 and 21, the forward latch-head being extended downward and the rear latch-head upward. Upon each outer side of the latch-lever a friction-roller 22 is journaled, adapted for contact with the inner face of the spring-actuated arms 14, which arms are stepped inward between the centers and the upper ends, so that when the rollers are carried upward they will contact with the stepped surfaces and force the arms outward a sufficient distance to remove the latch-head 15 of the arms from within the slot 16 of the shell-section C.

In the forward wall of the slot of the latch-lever a trip-bar 23 is pivoted, which bar is preferably semicircular in cross-section and extends downward within the tubular section of the shell, as best shown in positive lines, Fig. 3, and dotted lines, Fig. 4. The upper or pivotal end of the trip-bar is provided with a lug or extension 24, integral therewith, as shown in Fig. 3, whereby, although the bar may accommodate itself within the tubular section to the rise and fall of the latch-lever, its rearward movement is positively limited by contact with the rear end wall of the latch-bar slot. The latch-lever 19 is normally retained at its forward portion in contact with the tubular section C of the shell through the medium of a spring 25, secured at one end to a rod or bar 26, utilized to brace transversely the intermediate section of the shell, which bar is located near the rear end of the said shell, the forward end of the spring being carried outward beyond the intermediate section B to a contact with the upper face of the latch-lever, as shown in Fig. 3. The upward movement of the spring 25 is limited by a second transverse brace-bar 27, located above said spring and beneath the upper grooved pulley 12.

In the central section B of the shell, beneath the spring 25, two grooved pulleys 28 and 29 are journaled, the outer pulley 28, which is the smaller of the two, being located near the rear end of said section and the other pulley 29 at or near the intersection of the tubular section C with the intermediate section B, as clearly illustrated in Fig. 3; but, if desired, one of the said pulleys may be omitted, or their number may be increased.

In connection with the body of the device I employ a hoisting or trip sleeve 30, formed into a link 31 at the lower end, adapted for the reception of a hay-fork 32, or other carrying apparatus, as illustrated in Fig. 1. The hoisting or trip sleeve, as illustrated in Figs. 6 and 7, is preferably made in two sections bolted together in any approved manner. The upper or cylindrical portion 32ª of the sleeve is tubular, and is provided at the top with a peripheral flange 33, especially adapted for contact with the latches 15. In casting the sections the opposed concavities are formed with a series of spirals 34, of such contour as to receive the strands of a rope, as illustrated in said Figs. 6 and 7, the rope being illustrated in position in Fig. 6, and the concavity at the lower end of the body of the sleeve is so enlarged as to accommodate a knot in the end of the rope.

In attaching the hoisting-rope 35 to the sleeve one of the bolts uniting the sections is usually made to pass through the knot. The flange 33 of the sleeve 30 is sufficiently small to pass readily upward in the tubular section C of the shell, and, after pressing outward the latch-heads 15 of the spring-arms 14, to rest upon the upper surface of the said heads when they return to their normal position, as illustrated in Fig. 4.

In connection with my device I employ a track-rope 36, adapted to be rigidly secured at both ends to a vertical support, whereby the same will extend in a horizontal line from the point at which the load is to be taken to the point at which the said load is to be delivered, as illustrated in Fig. 1. In attaching the track-rope 36 to its support I usually secure upon the extremities of the rope a hook 37, made in two sections and provided with a spiral bore to receive the rope, said sections being clamped together by any approved means, as shown in Fig. 1. These hooks may be made to engage with other hooks 38, of any well-known form, secured to the said vertical support. Immediately in front of the hooks 37, at the receiving end of the track-rope, is secured a keeper-block 39, (illustrated in Fig. 1, and in detail section, Fig. 8,) consisting of two horizontal sections 40 and 41, having spiral longitudinal opposed grooves or recesses, whereby when the two sections 40 and 41 are brought together, clamping the rope, the strands of the rope will neatly fit in the spiral cavities of the recesses or grooves, as illustrated in Fig. 8.

The two sections are usually united by bolts 42, passed upward through the same, which bolts are integral with the upper extremity of the yoke 43, located beneath the latch-block, and provided with a semicircular downwardly-flaring lip 44.

Beneath the delivery end of the track-rope a keeper 45 is rigidly secured to support the said rope, as shown in Fig. 1, and beneath the said keeper a sheave 46 is also attached to the support. The hoisting-rope 35, attached to the hoisting or trip sleeve 30, is passed up through the tubular section C, over the grooved pulley 29, under the pulley 28, parallel with and beneath the track-rope, and over the sheave 46, to a connection with a drum 47 or equivalent device located at or near the delivery end of the track-rope, as shown in Fig. 1. The drum 47 may be rotated in any approved manner.

The shell 10 is held to travel upon the track-rope by means of the engagement with the same of the upper grooved pulleys 12 and 13, which for convenience I designate "track-pulleys."

In operation, the load having been secured to the hoisting or trip sleeve 30, the hoisting-rope 35 is wound upon the drum 47, and the said sleeve is thereby carried upward within the tubular section C of the shell, past the heads 15 of the arms 14, to a contact with the lower end of the trip-bar 23. Prior to this the forward end 21 of the latch-lever is brought in contact with the lip of the keeper-block 39. When the upper end or head of the hoisting or trip sleeve is brought to bear against the trip-rod 23, the forward end of the trip-lever 19 is elevated and the head 21 disengaged from the lip 44, and the device is then free to travel upon the track-rope 36 toward the delivery-point. Prior to being brought in this direction, however, the trip-sleeve is suffered to drop within the tubular section C, and the heads 15 of the spring-arms 14 receive and support the sleeve within the block. Thus by the further winding of the hoisting-rope 35 upon the drum the shell 10 with its load will freely travel toward the delivery-point. When the said point is reached, the rear end of the latch-lever engaging with the keeper 45 is elevated thereby. The said elevation of the latch-lever, by the contact of the attached friction-pulleys 22 with the spring-arms 14, presses the said arms outward, thereby withdrawing the heads 15 of said arms from the slots in the tubular section C of the shell, which action releases the hoisting or trip sleeve and suffers it to pass downward out of the shell to deliver its load. After the load is delivered the sleeve 30 is elevated in the same manner as heretofore set forth, the latch-lever disengaged from the keeper 45, and the shell 10 is drawn to the receiving-point by any approved means until the forward head 21 of the latch-lever is again brought in contact with the keeper-block 39 to receive another load.

I desire it to be understood that the friction-roller 22 may be omitted or equivalent device substituted without departing from the spirit of the invention.

Having thus described my invention, I claim as new and desire to secure by Letters Patent—

1. In a combined hoisting and conveying device, the combination, with a hollow shell having a tubular lower section provided with side slots, of spring-actuated arms secured to the said shell, having heads capable of entering the said slots, a latch-lever fulcrumed upon the shell, having a head at each end and capable of contact with the said arms, and a trip-bar secured to the said lever, substantially as shown and described.

2. In a combined hoisting and conveying device, the combination, with a hollow shell having a tubular lower section provided with side slots, an arm attached to each side of the shell, each of said arms provided with a head adapted to enter the said slots, and springs controlling said arms, of a spring-actuated latch-lever fulcrumed upon the shell, having a head at each end, a trip-bar extending downward from the said lever, and a trip-sleeve capable of entering the tubular section of the shell and of contact with the trip-bar, substantially as shown and described.

3. In a combined hoisting and conveying device, the combination, with a hollow shell having a tubular lower section provided with side slots, an arm pivoted at each side of the said shell, each of said arms having a head capable of entering the said slots, and springs controlling the said arms, of a spring-actuated latch-lever fulcrumed upon the shell, having a head at each end, friction-rollers pivoted to the side of the said latch-lever, capable of contact with the inclined inner faces of the said arms, a trip-bar pivoted to the latch-lever, extending downward within the tubular section of the shell, and a trip-sleeve capable of entering the said tubular shell-section and of contact with the trip-bar and the arms of said tubular section, substantially as and for the purpose specified.

4. In a combined hoisting and conveying device, the combination, with a hollow shell having a tubular lower section provided with side slots, a spring-actuated arm pivoted at each side of the shell, each of said arms having a head adapted to enter the said slots, and a spring-actuated latch-bar fulcrumed upon the shell near the center, having a head at each end facing in opposite directions, of a trip-bar pivoted to the latch-lever, extending downwardly within the tubular section of the shell, and a trip-sleeve provided with an annular flange at the upper end capable of entering the tubular section of the shell for contact with the side latches and the said trip-rod, substantially as and for the purpose specified.

5. In a combined hoisting and conveying device, the combination, with a hollow shell having a tubular lower section provided with side slots, grooved pulleys journaled in the upper portion of the said shell, an arm pivoted at each outer side of the shell, each of said arms having a head adapted to enter the said slots, springs bearing upon the said arms, a spring-actuated latch-lever fulcrumed upon the shell near the center, having a head at each end, and a trip-rod pivoted to the latch-lever extending downwardly within the tubular section of the shell, of a track-rope capable of contact with the said grooved pulleys, a keeper-block secured to the track-rope for contact with the latch-lever, and a trip-sleeve provided with an upper annular flange capable of entering the tubular section of the shell and for contact with the trip-rod, all combined for operation substantially as shown and described.

6. In a combined hoisting and conveying device, a snap-hook adapted for attachment with the hoist-rope, provided with a longitudinal sectional shank, each section being provided upon the inner face with semi-spiral or twist groove, conforming to the strands of a rope, and a bolt passing through and clamping the sections together, substantially as specified.

7. In a combined hoisting and conveying device, a clamp for application to a rope end, provided with a sectional shank having a spiral or twisted bore enlarged at the lower end to receive a knot, the walls of the bore corresponding in contour to the twist of a rope, substantially as specified.

8. In a combined hoisting and conveying device, the combination, with a hollow shell having a tubular lower section provided with side slots, grooved pulleys journaled in the upper portion of the said shell, an arm pivoted at each outer side of the shell, each arm having a head adapted to enter the said slots, springs bearing upon the said arms, a spring-actuated latch-lever fulcrumed upon the shell near the center, having a head at each end, and friction-rollers capable of engagement with the said arms, and a trip-rod pivoted to the latch-lever extending downwardly within the tubular section of the shell, of a track-rope capable of carrying the shell, a keeper-block secured to the said track-rope capable of engagement with the latch-lever, a trip-sleeve provided with an upper annular flange capable of entering the tubular section of the shell and for contact with the side latches, a rope attached to the sleeve, and means, substantially as shown and described, for raising and lowering the sleeve and moving the shell, as and for the purpose specified.

OREN W. O'DELL.

Witnesses:
FRED G. ROLLAND,
JOSIAH BUCKBEE.